W. V. TURNER.
FLUID PRESSURE BRAKE.
APPLICATION FILED DEC. 13, 1916.
1,294,978.
Patented Feb. 18, 1919.
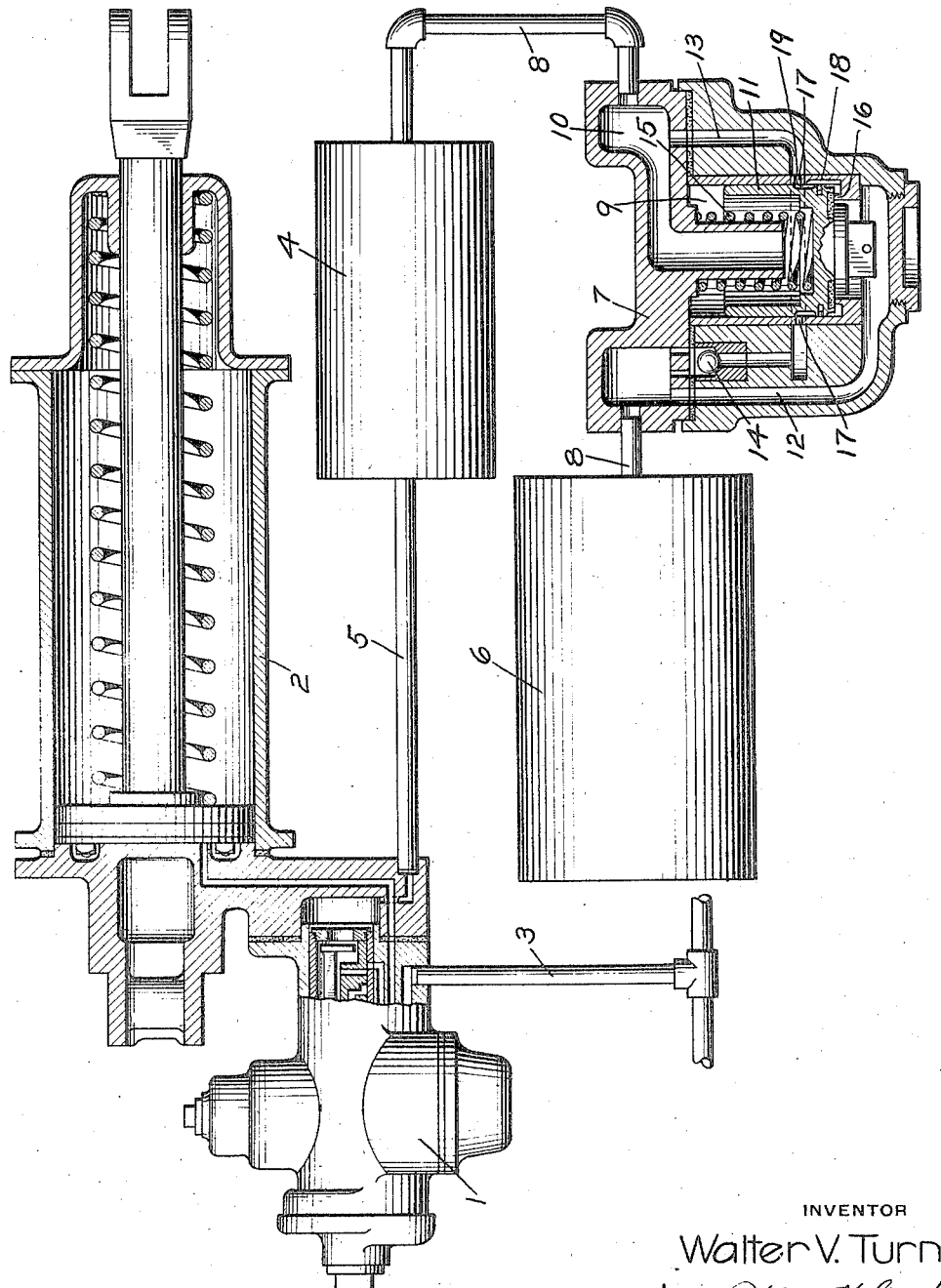
INVENTOR
Walter V. Turner
by *Wm. M. Cady*
att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,294,978.　　　Specification of Letters Patent.　　Patented Feb. 18, 1919.

Application filed December 13, 1916. Serial No. 136,608.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a brake apparatus for controlling the pressure in the brake cylinder.

Under certain conditions, such as operating on grades where heavy brake applications are required for controlling the train, by reason of the spring of the brake rigging and the drag of the brake shoes around the car wheels, a false brake cylinder piston travel is set up which causes the slack adjuster to take up slack in the same manner as brake cylinder piston travel due to brake shoe wear. If a number of heavy brake applications are made, the slack is eventually taken up so that while the slack adjuster may have been originally set so as to maintain the brake cylinder piston travel at a certain standard, say of eight inches, if a light brake application should thereafter be effected, the brake cylinder piston may move out only four to five inches, and the consequence is that, by reason of the reduced brake cylinder volume, the brake cylinder pressure obtained will be higher than desired and will be liable to result in shocks brought about by the running in of the slack due to the excessive brake application at the head end of the train before the brakes are applied at the rear end.

According to the principal object of my invention, it is proposed to provide a brake cylinder adapted to permit a greater brake cylinder piston travel than the standard, so that the slack adjuster may be adjusted to take up slack at a point beyond the usual standard adjusting point, for example, at eleven inches piston travel. By this means, even when the slack is taken up by the action of false piston travel, the minimum brake cylinder piston travel will not be as short as formerly, thus restoring the brake cylinder volume to more nearly standard conditions.

In order to further prevent a high brake cylinder pressure under a light reduction in brake pipe pressure, a small auxiliary reservoir is employed, but since a small auxiliary reservoir will not give the desired high brake cylinder pressure when a heavy application of the brakes is effected, means are provided for connecting an additional reservoir to the auxiliary reservoir when the auxiliary reservoir pressure decreases to a predetermined degree.

In the accompanying drawing, the single figure is a partly sectional view of a fluid pressure brake equipment embodying my invention.

As shown in the drawing, the equipment may comprise a triple valve device 1 connected to a brake cylinder 2 and to brake pipe 3 in the usual manner.

According to my invention, a small auxiliary reservoir 4 is provided, which is connected by pipe 5 to the triple valve device 1 and an additional reservoir 6 is employed, the connection of which to the auxiliary reservoir 4 is controlled by a weighted valve device 7 interposed in the pipe 8, leading from the reservoir 6 to the auxiliary reservoir 4.

The weighted valve device 7 may comprise a casing having a piston chamber 9 connected by passage 10 to the auxiliary reservoir side of pipe 8 and containing a valve piston 11 for controlling communication from passage 12 leading to the additional reservoir side of pipe 8 to passage 13 communicating with passage 10.

In operation, when fluid is supplied to the brake pipe 3, the auxiliary reservoir 4 is charged from the triple valve device 1 in the usual manner and fluid from the auxiliary reservoir 4 flows through pipe 8 and passage 13 past a ball check valve 14 to the additional reservoir 6, charging same to the standard pressure carried, the check valve 14 being provided to prevent back flow from reservoir 6 to auxiliary reservoir 4. Fluid from the auxiliary reservoir 4 also flows to the piston chamber 9 and since the passage 12 opens to the seated area of valve piston 11, the fluid pressures on opposite sides of the valve piston are equalized and the spring 15 maintains the valve piston on its seat 16.

Upon reducing the brake pipe pressure to effect a service application of the brakes, the triple valve device 1 operates in the usual manner to supply fluid from the auxiliary reservoir 4 to the brake cylinder 2 and the auxiliary reservoir 4 being of relatively small capacity, even if the brake cylinder piston travel is short, the brake cylinder pressure will not rise rapidly and as a consequence, there is time for the brakes to apply at the rear end of the train before the braking pressure at the head end is sufficient to cause shocks by the running in of the unbraked cars at the rear end of the train.

When the brake pipe reduction is such that the auxiliary reservoir pressure is reduced by flow to the brake cylinder to a point such that the combined pressures of the spring 15 and the reduced auxiliary reservoir pressure are overcome by the pressure in reservoir 6 acting on the seated area of the valve piston 11, then the valve piston will be lifted from its seat, exposing the full area to pressure from the reservoir 6.

While a prompt and positive opening of the valve piston is thus secured, the increasing resistance of the spring 15 tends to retard the movement and by locating the ports 17, so that they are not opened until the valve piston has moved a certain distance, a gradual opening of the ports is secured, so that the flow of fluid from the reservoir 6 to the auxiliary reservoir 4 is gradual and a sudden increase in brake cylinder pressure is thus prevented.

If the pressure in the auxiliary reservoir 4 increases to a point at which its pressure plus the pressure of the spring 15 exceeds the pressure in reservoir 6, then the valve piston 11 will move to close the ports 17. On the other hand, if the auxiliary reservoir pressure reduces too fast, the valve piston will move to open the ports 17 wider and thus permit a more rapid flow from the reservoir 6 to the auxiliary reservoir 4.

In other words, the valve piston 11 floats when in action and acts to maintain the pressure in the auxiliary reservoir 4 at a substantially constant differential with respect to the pressure in reservoir 6 and corresponding with the pressure of the spring 15.

In order to provide for possible leakage past the seated valve piston 11, leakage grooves 18 and 19 may be provided, so that fluid leaking past the valve piston to the differential area can escape through the port 17.

The brake cylinder 2 is made relatively long, according to my invention, so that the slack adjuster can be adjusted to take up slack at a brake cylinder piston travel greater than the usual standard, for example, at eleven inches instead of eight inches, so that even when all the slack is taken up which would be possible by reason of false piston travel, the travel will still be greater than formerly, say eight inches instead of four or five inches.

By this means excessively short piston travel is prevented and as hereinbefore described, the desired high brake cylinder pressure in a heavy application of the brakes is secured by connecting an additional reservoir to the auxiliary reservoir upon a predetermined reduction in auxiliary reservoir pressure by flow to the brake cylinder.

Having now described my invention, what I claim as new and desire to secure by Letters Patent is:

1. In a fluid pressure brake, the combination with an auxiliary reservoir, of an additional normally charged reservoir and valve means operated upon a predetermined reduction in auxiliary reservoir pressure for supplying fluid from said additional reservoir to the auxiliary reservoir upon a predetermined movement of said valve means.

2. In a fluid pressure brake, the combination with an auxiliary reservoir, of an additional normally charged reservoir and a normally seated valve piston subject on one side to the pressure in the additional reservoir and on the opposite side to auxiliary reservoir pressure and the pressure of a spring and operated upon a predetermined reduction in auxiliary reservoir pressure to first unseat and then upon a further movement to open a port for supplying fluid from said additional reservoir to the auxiliary reservoir.

3. In a fluid pressure brake, the combination with an auxiliary reservoir, of an additional reservoir normally charged with fluid under pressure and valve means constantly subject on one side to pressure in the additional reservoir and on the opposite side to the pressure in the auxiliary reservoir and the pressure of a spring and movable upon a reduction in auxiliary reservoir pressure to first open a large port and then a port for supplying fluid from the additional reservoir to the auxiliary reservoir through said large port.

4. In a fluid pressure brake, the combination with a brake cylinder piston and a brake cylinder for said piston, adapted to permit a substantially greater than normal travel of the brake cylinder piston, and an auxiliary reservoir having a volume substantially less than normal from which fluid is supplied to the brake cylinder in making an application of the brakes, of an additional normally charged reservoir and means for connecting the additional reservoir to the auxiliary reservoir, upon a predetermined reduction in auxiliary reservoir pressure, to compensate for the abnormally small auxiliary reservoir volume and abnormal brake cylinder piston travel.

In testimony whereof I hereunto set my hand.

WALTER V. TURNER.